United States Patent [19]
Kinoshita et al.

[11] Patent Number: 5,790,803
[45] Date of Patent: Aug. 4, 1998

[54] INFORMATION NETWORK WITH SERVER, CALL BLOCKING, SUBSCRIBER STATUS, AND ATTRIBUTES IN A TABLE, AND SELECTING OF TERMINAL EQUIPMENT

[75] Inventors: Shigeaki Kinoshita; Mutsumi Abe; Mitsuru Ikezawa, all of Yokohama; Takanori Miyamoto, Fuchu; Makoto Ujiie, Urayasu, all of Japan

[73] Assignee: Hitachi, Ltd., Tokyo, Japan

[21] Appl. No.: 556,453

[22] Filed: Nov. 15, 1995

[30] Foreign Application Priority Data

Nov. 21, 1994 [JP] Japan ................. 6-286285

[51] Int. Cl.⁶ .............................................. G06F 15/16
[52] U.S. Cl. ............. 395/200.75; 370/352; 364/DIG. 1
[58] Field of Search ............................... 370/352; 379/67, 379/114, 88; 395/200.16, 200.75

[56] References Cited

U.S. PATENT DOCUMENTS

| | | | |
|---|---|---|---|
| 4,625,081 | 11/1986 | Lotito et al. | 379/88 |
| 5,315,705 | 5/1994 | Iwami et al. | 395/200.16 |
| 5,440,541 | 8/1995 | Iida et al. | 370/352 |
| 5,550,899 | 8/1996 | McLeod et al. | 379/67 |
| 5,590,181 | 12/1996 | Hogan et al. | 579/114 |

*Primary Examiner*—Tod R. Swann
*Assistant Examiner*—David Langjahr
*Attorney, Agent, or Firm*—Antonelli, Terry, Stout & Kraus, LLP

[57] ABSTRACT

In a subscriber information service system including a plurality of terminal equipment, and an information server for presenting personal information of a called subscriber to user at each of the terminal equipment, the information server being connected to the plurality of terminal equipment through a communication network, the information server has a subscriber information table consisting of a plurality of personal records each including a personal identifier assigned to a subscriber, a name of the subscriber, status information of the subscriber, and a name and an equipment address of the communication equipment which can be utilized by a user, and a facility of transmitting content data of the personal record of the specific subscriber registrated in the subscriber information table to each of the terminal equipment. Prior to the communication with the called subscriber, the user at each of the terminal equipment requests the information server to transmit the personal record of the called subscriber, and determines both the status of the called subscriber and the optimal communication equipment by referring to the contents of the personal record received from the information server.

5 Claims, 15 Drawing Sheets

FIG.3A

200 PERSONAL INFORMATION TABLE

| | 201 | 202 | 203 | 204 | 205 | 206 |
|---|---|---|---|---|---|---|
| | PERSONAL ID | SUBSCRIBER NAME | SUBSCRIBER POST | DESTINATION | AVAIL-ABILITY | COMMUNI-CATION EQUIPMENT |
| 20-1 | 670190094 | S. SUZUKI | xxxxxx | CONFERENCE ROOM A | NO | |
| 20-2 | 670190095 | K. SATOH | xxxxxx | B COMPANY | NIL | |
| | 670190096 | M. YAMADA | xxxxxx | IN THE ROOM | YES | |
| | ... | ... | ... | ... | ... | |
| 20-m | ... | ... | ... | ... | ... | |

FIG.3B

210 COMMUNICATION EQUIPMENT INFORMATION TABLE

| PERSONAL ID | COMMUNICATION EQUIPMENT | DEVICE ADDRESS |
|---|---|---|
| 670190094 | FACSIMILE | 0123 45 6798 |
|  | E-MAIL | abcdef @ gh.co.jp |
|  | PAGER | 0123 54 9876 |
|  | TELEPHONE | 0123 45 6789 1234 |
|  | WIRELESS TEL | 0123 98 7654 2468 |
| 670190095 | FACSIMILE | 0123 98 7654 |
|  | E-MAIL | xyz @ trq.co.jp |
|  | TELEPHONE | 0123 98 7655 4567 |
| ... | ... | ... |

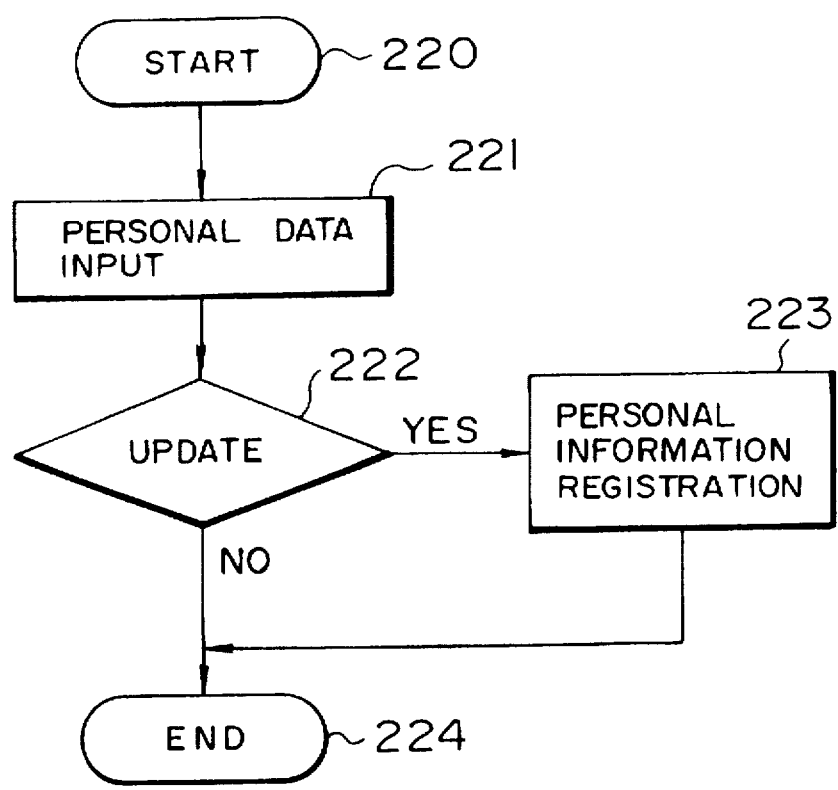

FIG.6

113 DISPLAY SCREEN

SUBSCRIBER NAME LIST — 24

| NAME | POST |
|---|---|
| S. SUZUKI | x x x x x x x x |
| K. SATOHO | x x x x x x x x |
| M. YAMADA | x x x x x x x x x |
| ⋮ | ⋮ |

FIG.7

113 DISPLAY SCREEN

PESONAL INFORMATION

| | | |
|---|---|---|
| 202 — NAME | SIGERU SUZUKI | |
| 203 — POST | SYSTEM PRODUCTS DEPT. HITACHI Ltd. | |
| 204 — DESTINATION | CONFERENCE ROOM A | |
| 205 — AVAILABILITY | NO | |

| EQUIPMENT | ADDRESS | |
|---|---|---|
| 207 — | | 208 |
| 207-1 — FAX | 0123 45 6798 | 208-1 |
| 207-2 — E-MAIL | abcdef @ gh.co.jp | 208-2 |
| 207-3 — PAGER | 0123 54 9876 | 208-3 |
| 207-4 — TEL | 0123 45 6789 1234 | 208-4 |
| 207-5 — WIRELESS TEL | 0123 98 7654 2468 | 208-5 |

FIG. 8

400 TABLE-A

| EQUIPMENT NAME | FIXED TYPE (401) | REAL TIME (402) |
|---|---|---|
| TELEPHONE | 1 | 1 |
| RECORDABLE PHONE | 1 | 0 |
| VOICE MAIL | 1 | 0 |
| FACSIMILE | 1 | 0 |
| MOBILE TELEPHONE | 0 | 1 |
| MOBILE FACSIMILE | 0 | 0 |
| PAGER | 0 | 1 |
| ELECTRONIC-MAIL | 1 | 0 |
| TV PHONE | 1 | 1 |
| TELE-CONFERENCE | 1 | 1 |
| ⋮ | ⋮ | ⋮ |

FIG. 9

410 TABLE-B

| PERSONAL ID (201) | EQUIPMENT NAME (207) | ADDRESS (208) | |
|---|---|---|---|
| xxxxxxx | ELECTRONIC-MAIL | hitachi @ xxx.hitachi.co.jp | 410-1 |
| | FACSIMILE | 0423 - xxx - yxyx | 410-2 |
| | VOICE MAIL | 0423 - yy - yyyy | 410-3 |
| | RECORDABLE PHONE | 0423 - xx - xyxy | 410-4 |
| | MOBILE TELEPHONE | 033 - xxxx - yyyy | 410-5 |
| | TELEPHONE | NIL | 410-6 |
| | ELCTRONIC - MAIL | KKK0001 | 410-7 |

FIG. 10

420 TABLE-C

| LOCATION | EQUIPMENT NAME | ADDRESS |
|---|---|---|
| CONFERENCE ROOM A | TELEPHONE | 0423-yy-yyy1 |
| CONFERENCE ROOM A | TV PHONE | 0423-yy-yyy2 |
| CONFERENCE ROOM B | TELEPHONE | : |
| CONFERENCE ROOM B | FACSIMILE | : |
| CONFERENCE ROOM B | TELE CONFERENCE | : |
| x x x x x x x | TELEPHONE | : |
| x x x x x x x | TELEPHONE | : |
| ⋮ | ⋮ | ⋮ |

FIG. 11

450 TABLE-D

| LOCATION | EQUIPMENT NAME | ADDRESS |
|---|---|---|
| CONFERENCE ROOM A | TELEPHONE | 0423-yy-yyy1 |
| CONFERENCE ROOM A | TV PHONE | 0423-yy-yyy2 |

FIG. 16

460 TABLE-E

| EQUIPMENT NAME | ADDRESS |
|---|---|
| ELECTRONIC-MAIL | hitachi @ xxx.hitachi.co.jp | 460-1
| FACSIMILE | 0423-xx-yxyx | 460-2
| VOICE MAIL | 0423-yy-yyyy | 460-3
| RECORDABLE PHONE | 0423-xx-xyxy | 460-4
| MOBILE TELEPHONE | 033-xxxx-yyyy | 460-5
| TELEPHONE | 0423-yy-yyy1 | 460-6
| ELCTRONIC-MAIL | KKK0001 | 460-7
| TV PHONE | 0423-y-yyy2 | 460-8

Columns 207, 208.

FIG. 18

470 REARRANGED TABLE-E

| EQUIPMENT NAME | ADDRESS |
|---|---|
| MOBILE TELEPHONE | 033-xxxx-yyyy | 460-5
| TELEPHONE | 0423-yy-yyy1 | 460-6
| TV PHONE | 0423-yy-yyy2 | 460-8
| ELECTRONIC-MAIL | hitachi @ xxx.hitachi.co.jp | 460-1
| FACSIMILE | 0423-xx-yxyx | 460-2
| VOICE MAIL | 0423-yy-yyyy | 460-3
| RECORDABLE PHONE | 0423-xx-xyxy | 460-4
| ELECTRONIC-MAIL | KKK0001 | 460-7

Columns 207, 208.

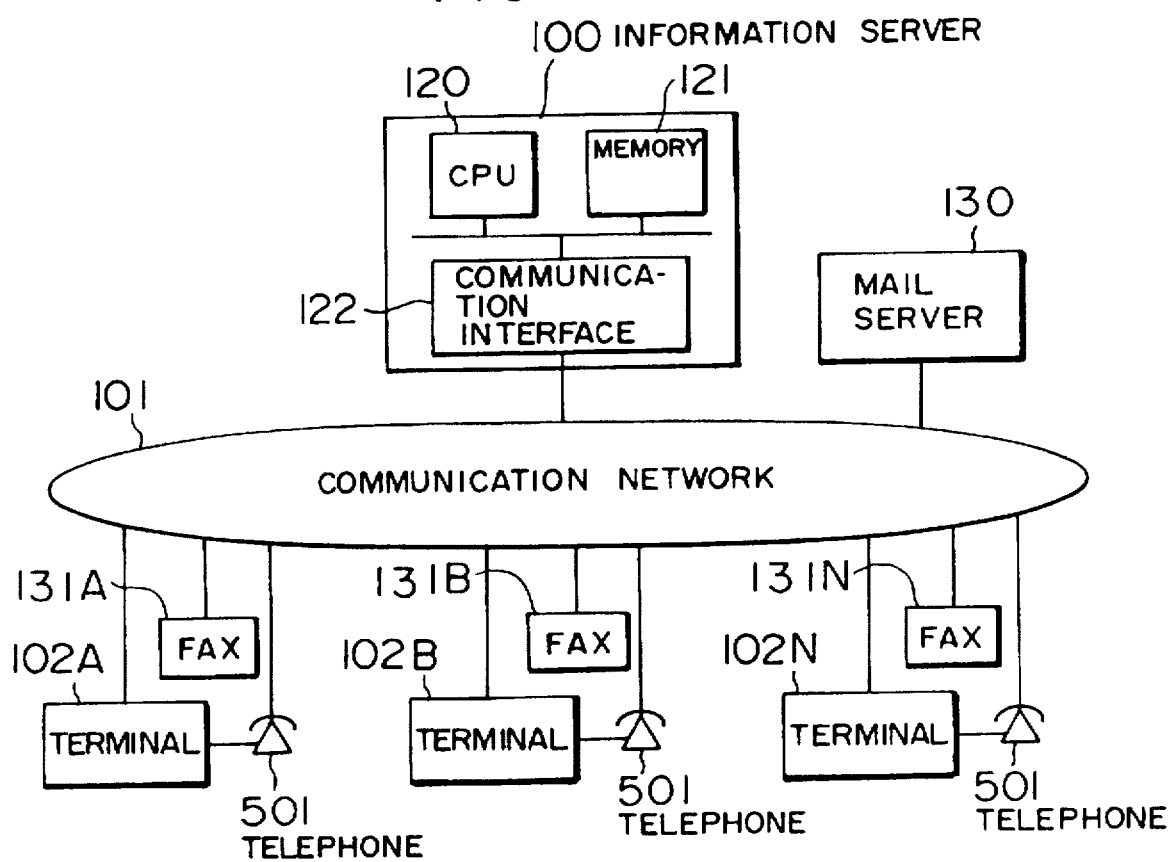
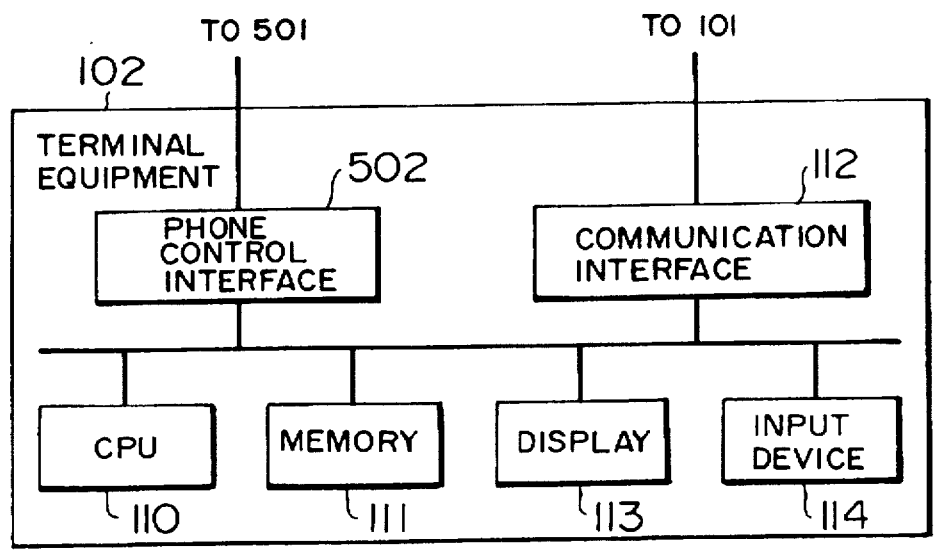

INFORMATION NETWORK WITH SERVER, CALL BLOCKING, SUBSCRIBER STATUS, AND ATTRIBUTES IN A TABLE, AND SELECTING OF TERMINAL EQUIPMENT

BACKGROUND OF THE INVENTION

1. Field of the Invention

The present invention relates in general to a subscriber information service system, and more particularly to a subscriber information service system which is designed in such a way that a caller can select terminal equipment which is convenient for a called subscriber.

2. Description of the Related Art

A conventional communication network system, which is represented by a telephone, is, in general, a caller predominance system in which the circumstances of a called subscriber (receiver) are disregarded, and the communication is carried out when it is convenient for a caller (transmitter). In order to allow the incoming call from the specific caller by the communication equipment installed in the called subscriber side, for example, there are known a system in which only the incoming call from the terminal equipment having a specific dial number, which is previously stored in the above-mentioned terminal equipment is received, or a method in which the caller is made to input a secret number, which is previously communicated to only specific subscribers, next to the dial number, and also that secret number is checked by the reception side terminal equipment and hence only the call accompanied by the proper secret number is selectively received.

In addition, in JP-A-6-253047, there is proposed a communication system which is designed in such a way that during the call set up, the originating terminal transmits to the destination terminal the caller identification information such as a caller's name and a personal number, and only then the call from the caller fulfilling the conditions which are previously registered in the destination terminal is permitted, and in the case where those conditions are not fulfilled, the caller identification information is displayed in order to wait for a decision as to accept the call or not by the called subscriber, and as a result, the communication is permitted or refused by the operation by the called subscriber.

However, according to the above-mentioned conventional communication system, there is the possibility that since the call is received by the communication equipment which the caller selects in an one-sided manner, even when the caller fulfilling the permission conditions wants communicate with a subscriber at the call receiving terminal, the subscriber at the receiving terminal may not be reached due to the circumstances of the called subscriber side such as the absence or the busy state of the called subscriber in some cases.

SUMMARY OF THE INVENTION

It is therefore an object of the present invention to provide a communication network system by which the caller can surely communicate with the called subscriber and hence futile calling can be prevented.

It is another object of the present invention to provide a communication network by which the caller can send a call to the communication equipment which is convenient for the called subscriber.

It is still another object of the present invention to provide a subscriber with an information service system which is capable of informing, prior to the communication, the caller of the state of the called subscriber, and the type and the equipment address of the communication equipment with which the communication can be carried out.

It is yet another object of the present invention to provide a subscriber information service system by which each of the subscribers can readily register and change the personal information which is to be communicated to other subscribers.

In order to attain the above-mentioned objects, a subscriber information service system according to the present invention includes a plurality of terminal equipment and an information server for presenting personal information of a called subscriber to users at each of the terminal equipment, the information server being connected to the plurality of terminal equipment through a communication network, wherein the information server includes a memory for storing a subscriber information table consisting of a plurality of personal records, each of the personal records including a personal identifier assigned to each subscriber, the name of the subscriber, status information of the subscriber, and a name and an equipment address of the communication equipment which can be utilized by the subscriber, and means for transmitting, in response to a service request issued from any one of the terminal equipment, either subscriber list data including a plurality of subscribers' names registrated in the subscriber information table, or content data of the personal record of the specific subscriber. Each of the terminal equipment includes means for transmitting the service request, which has been issued in order to request the distribution of either the subscriber list or the personal record of the specific subscriber(s), to the information server, and means for displaying either the subscriber list data or the content data of the personal record which have been received from the information server.

According to an embodiment of the present invention, each of the terminal equipment includes input means for inputting the updated data relating to either item of one personal record registered in the subscriber information table, and means for transmitting the updated data to the information server. The information server includes update means for rewriting the contents of one personal record in the subscriber information table in accordance with the updated data which has been received from either terminal equipment.

In a preferred embodiment of the present invention, first status information, as the subscriber status information, representing the destination of the subscriber, and second status information representing whether or not the limit of the direct contact to the subscriber is present are stored in each of the personal records in the subscriber information table. The update means includes translation table means for defining, in correspondence to the location name, both a name and an equipment address of the communication equipment installed in that location, and means for automatically adding both the name and the equipment address of the communication equipment installed in the destination which has been obtained by referring to the translation table means to the personal record when the updated data received by the terminal equipment belongs to the first status information.

When the updated data received by the terminal equipment belongs to the second status information, the information server may automatically change the arrangement order of the kind of the communication equipment and the equipment addresses thereof, which are included in the personal record, in accordance with whether or not the limit of the contact to the subscriber is present.

Other features of the present invention are such that each of the terminal equipment further includes input means for specifying one of the name and the equipment address of the communication equipment included in the personal record displayed by the display means, and means for automatically calling the equipment address of the communication equipment specified by the input means.

The foregoing and other objects, advantages, manner of operation and novel features of the present invention will be understood from the following detailed description when read in conjunction with the accompanying drawings.

BRIEF DESCRIPTION OF THE DRAWINGS

FIG. 3A is a view showing a structure of a subscriber information table 200 included in an information server 100;

FIG. 3B is a view showing an example of the contents of a communication equipment information table included in the information server;

FIG. 4 is a flow chart showing the procedure of registrating the personal information of a subscriber;

FIG. 6 is a view showing an example of a screen of a list of subscribers' names output to the terminal equipment;

FIG. 7 is a view showing an example of a screen of the personal information displayed on the terminal equipment;

FIG. 8 is a view showing an example of the contents of a communication equipment attribute table included in the information server;

FIG. 9 is a view showing an example of the contents of a communication equipment table included in the information server;

FIG. 10 is a view showing an example of the contents of "a location-to-communication equipment correspondence table" included in the information server;

FIG. 11 is a view showing an example of the contents of "the location-to-communication equipment correspondence table" prepared for every subscriber;

FIG. 16 is a view showing an example of the contents of a communication equipment table which has been automatically updated;

FIG. 18 is a view showing an example of the contents of the communication equipment table which has been automatically changed by a rearrangement processing in which the real time system is given top priority;

FIG. 19 is a block diagram showing a configuration of another embodiment of the subscriber information service system according to the present invention; and FIG. 20 is a block diagram showing a configuration of another embodiment of the terminal equipment.

DESCRIPTION OF THE PREFERRED EMBODIMENTS

Figure 1:
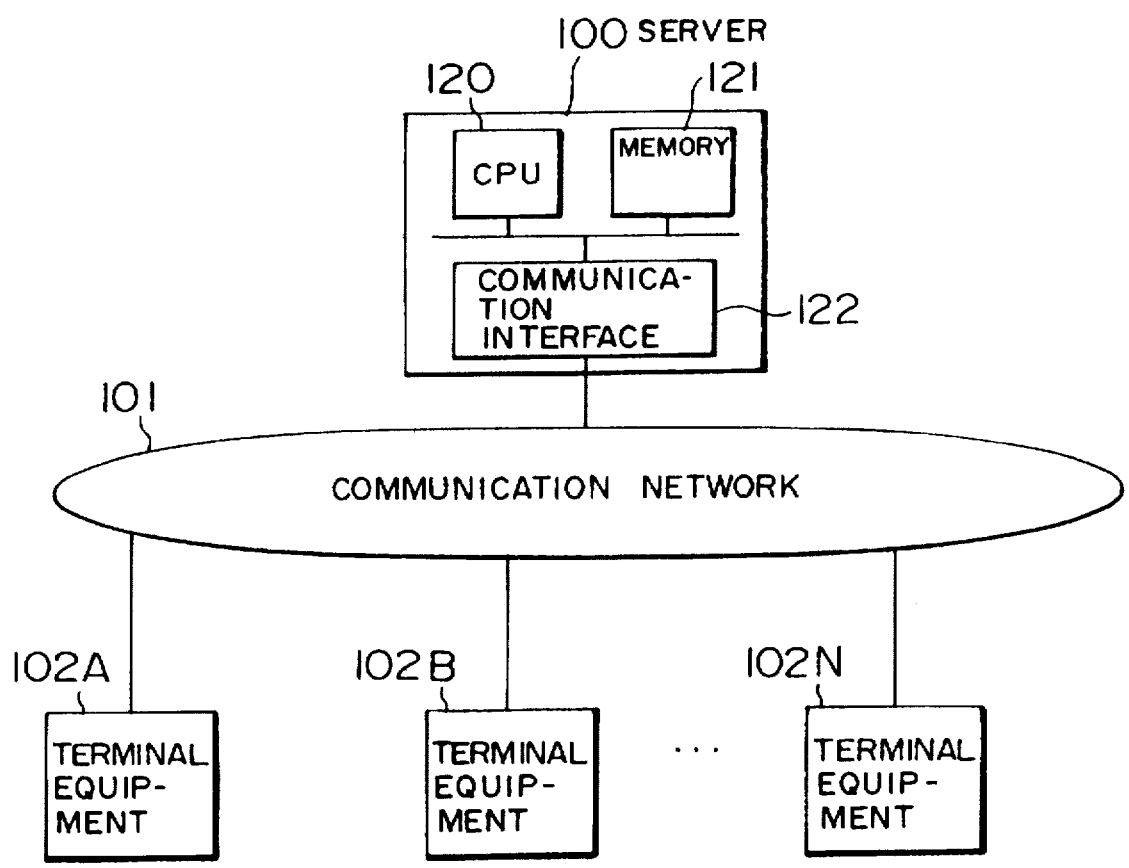
FIG. 1 is a block diagram showing a configuration of an embodiment of a subscriber information service system according to the present invention.

FIG. 1 shows a configuration of a communication network having a subscriber information service function according to the present invention.

Reference numeral 102 (102A to 102N) designates terminal equipment, and reference numeral 100 designates an information server for presenting subscriber information, which will be described later, to each of the terminal equipment. Each of the terminal equipment and the information server are connected to each other through a communication network 101.

The above-mentioned information server 100 includes a CPU 120, a memory 121, and a communication interface 122 through which the CPU 120 and the memory 121 are connected to a communication network 101.

Figure 2:
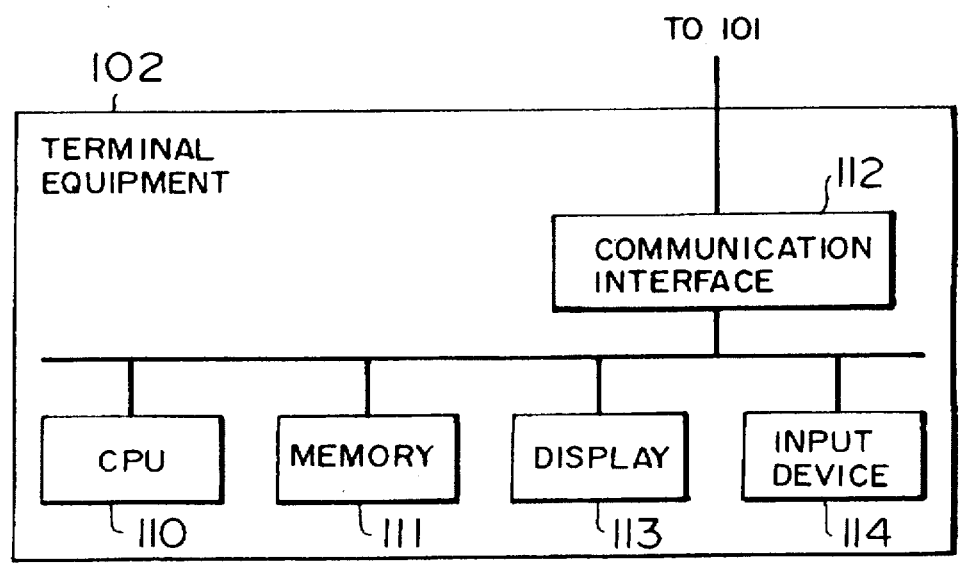
FIG. 2 is a block diagram showing a configuration of terminal equipment connected to a communication network.

Each of the terminal equipment 102 includes, as shown in FIG. 2, a CPU 110, a memory 111, a display device 113, an input device 114 and a communication interface 112 through which the corresponding terminal equipment 102 is connected to the communication network.

In the memory 121 of the information server 100, both a personal information table 200 relating to the subscribers as shown in FIG. 3A and a communication equipment information table 210 as shown in FIG. 3B are stored.

The personal information table 200 consists of a plurality of personal information records 20 (20-1 to 20-m) which are respectively managed with personal identifiers 201 assigned to the respective subscribers.

Each of the personal information records 20 consists of a personal identifier 201, the name 202 of the respective subscriber, a personal attribute 203 such as a post in a company to which the subscriber belongs and the like, a destination 204 (first status information) of the subscriber, the subscriber's status (second status information) 205 indicating whether or not the user can directly contact to the subscriber, and communication equipment information 206 which includes pointer information pointing to the communication equipment information table 210.

The above-mentioned communication equipment information table 210 is defined by a record consisting of a name (or type) 207 of the communication equipment, e.g., a telephone, a facsimile, an electronic mail or the like, which can be utilized in order to communicate with the subscriber, and an equipment address 208 representing a dial number or an address assigned to each of the communication equipment. In this connection, both the name 207 of the communication equipment and the equipment address 208 thereof correspond to the personal identifier 201. Those communication equipment records are arranged in the order of priority which the subscriber desires.

Incidentally, the various types of communication equipment which are registered in the communication equipment information table 210 may be either those which are directly accommodated in the communication network 101 as shown in FIG. 1, or those which may be accommodated in a communication network different from the communication network 101, e.g., a public network. In addition, the specific communication equipment facility such as the facsimile facility or the electronic mail facility may be incorporated integrally with the terminal equipment 102.

The contents in the above-mentioned communication equipment information table 210 may be directly registered as the equipment information 206 in the personal information table 200. Then, the items 201 to 208 will be referred collectively to as "the personal information" of the subscriber, when applicable in the following description.

A user at each of the terminal equipment 102 connects the corresponding terminal equipment to the information server 100 through the communication network 101 by operating the input device 114, and refers to the contents of the personal information table 200 and the communication equipment information table 210 of the user himself through the screen of the display device 113, adds the new record to those tables and updates the contents of the personal record which is already registered. In addition, the input device 114 may be a keyboard, a touch panel, a mouse, a voice input device or the like as long as such a device can input both the command and the data which are required for the communication between the input device and the information server 100.

FIG. 4 shows a flow chart of a program for controlling both the registration and the update of the subscriber personal information from the terminal equipment 102.

When the information server 100 has received an input screen request for the registration/update of the subscriber personal information, the information server 100 transmits the data set for presenting a personal information input frame to the screen of the terminal equipment and then waits for the input of the updated data from the terminal equipment (Step 221).

By receiving the data set, the terminal equipment 102 can output the personal information input frame consisting of a plurality of input fields corresponding to the items 201 to 205 as shown in FIG. 3A, and the items 207 and 208 as shown in FIG. 3B to the display screen.

When the above-mentioned registration request is issued with one of the records, which are already registered in the personal information table 200, specified by the personal identifier (or the subscribers' name), the registered data corresponding to the personal identifier (or the subscribers' name) is displayed in each of the fields of the above-mentioned output frame.

When the input of the updated data has been completed in the terminal equipment 102 and then the registration request is issued, the information server 100 side determines in which item of the subscriber personal information the data updates were performed. Then, when the update of data was performed in either item, the contents of either the personal information table 200 or the communication equipment information table 210 are updated (Step 223). When a new record is produced in response to the input of the updated data, the new record is added to the personal information table 200. The personal identifier 201 to be assigned to the new record may be either input from the terminal equipment or assigned automatically on the information server side.

Figure 5:
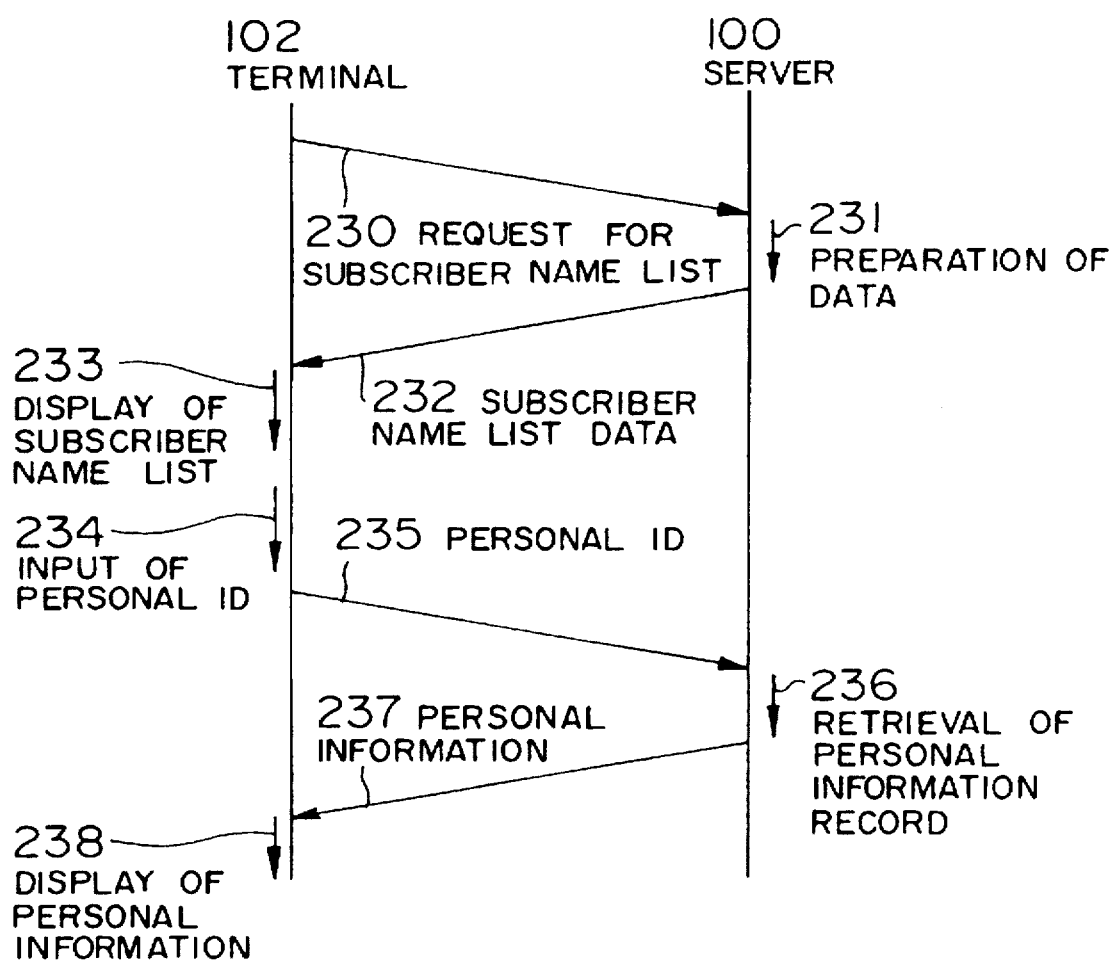
FIG. 5 is a view showing the procedure of performing the communication between terminal equipment and the information server in order to display the personal information of the subscriber on the terminal equipment.

FIG. 5 shows a sequence when the terminal equipment 102 inquires of the information server 100 the personal information of any other subscriber (the called subscriber).

In order to specify the personal identifier of the called subscriber as the other party for the communication, the user at the terminal equipment 102 as the caller issues the request for the subscriber name list to the information server 100 (Step 230). That request may be accompanied with the retrieval conditions such as the name or the post of the subscriber in order to limit the number of subscribers' names in the list to be answered from the information server. In addition, when the personal identifier of the called subscriber is already known to the user at the terminal equipment, that request for the subscriber name list may be omitted and instead the request for the personal information which will be described later may be issued.

The information server 100 which has received the above-mentioned request 230 for the subscriber name list extracts the personal identifiers 201, the names 202 of the subscribers and the posts 203 with respect to a plurality of subscribers which have been retrieved from the personal information table 200 (Step 231), and then transmits the data thus obtained as the subscriber name list data to the terminal equipment 102 of the caller (Step 232).

The terminal equipment 102 which has received the subscriber name list outputs the subscriber name list 24 representing both the personal names and the posts to the display screen as shown in FIG. 6 for example (Step 233). When the number of subscribers in the subscriber name list is large, the program is arranged in such a way that the contents of the list will be able to be scrolled on the display screen later.

The user at the terminal equipment 102 learns of the called subscriber from the subscriber name list on the display screen and then inputs the personal identifier thereof (Step 234). The input of the personal identifier has only to specify the subscriber by positioning the cursor to the name of the subscriber of interest for example. Then, the terminal equipment 102 transmits the personal identifier corresponding to the subscriber thus specified to the information server 100.

The information server 100 which has received the above-mentioned personal identifier retrieves the personal information record corresponding to the above-mentioned personal identifier from the personal information table 200 (Step 236) and then transmits the personal information record thus retrieved as the personal information to the terminal equipment 102 (Step 237). Then, the terminal equipment 102 displays the above-mentioned personal information, which has been received from the information server 100, in the form of the display format as shown in FIG. 7, for example, on the display device 113 (Step 238).

The user at the terminal equipment 102 can determine the status 205 of the called subscriber with whom the user intends to communicate from now on, the names 207 (207-1 to 207-5) of the communication equipment with which the termination can be performed, and the equipment addresses 208 (208-1 to 208-5) in the order of priority which the called subscriber desires by referring to the personal information displayed on the display screen. Therefore, the user at the terminal equipment selects the communication equipment which is convenient for the called subscriber on the basis of the personal information thus displayed and then dials the address of the selected equipment, whereby the user can surely communicate with the called subscriber.

Next, the description will hereinbelow be given with respect to an embodiment of the improved processing 223 of registering/updating the personal information which makes the data input operation from the terminal equipment easy.

This embodiment is designed in such a way that tables A to D, as will be described later, which are prepared in the memory 121 are utilized, whereby by only specifying the destination by the subscriber, the information server 100 automatically adds the address of the communication equipment, with which the caller can call the called subscriber at that destination, to the personal record.

The table A is, as shown in FIG. 8, a communication equipment attribute table in which in correspondence to a name 401 of the communication equipment, both a first attribute 402 representing whether that communication equipment is either of the installation (fixed) type or of the movable type, and a second attribute 403 representing whether that communication equipment is either of the real-time type or of the stored type are stored.

The table B is, as shown in FIG. 9, a communication equipment information table 410 in which the communication equipment, which is to be used by the subscriber, is defined by records 410 (410-1 to 410-7) consisting of names 207 of equipment and equipment addresses 208 in correspondence to the personal identifier 201, and has the same structure as that of the communication equipment information table 210 as shown in FIG. 3B. In this embodiment, as shown in the record 410-6, with respect to the fixed type telephone, in order to enable the different telephone numbers to be automatically set in accordance with the destination, a specific code "nil" is set in the equipment address 208. In addition, in accordance with the order of priority of the equipment for which the subscriber of interest desires the incoming, records 410-1 to 410-7 are registered in the above-mentioned table 410.

The table C is, as shown in FIG. 10, a location/communication equipment correspondence table 420 in which, in correspondence to locations 421 which may be the destinations of the subscriber, names 422 of the communication equipment installed in those locations and equipment addresses 423 are stored.

The table D is a destination location/communication correspondence table 450 by subscriber which is produced on the basis of the above-mentioned table C, and in which, as shown in FIG. 11 in correspondence to the destination locations 451 specified by the subscribers, names 452 of the communication equipment installed in those locations and equipment addresses 453 are stored.

Figure 12:
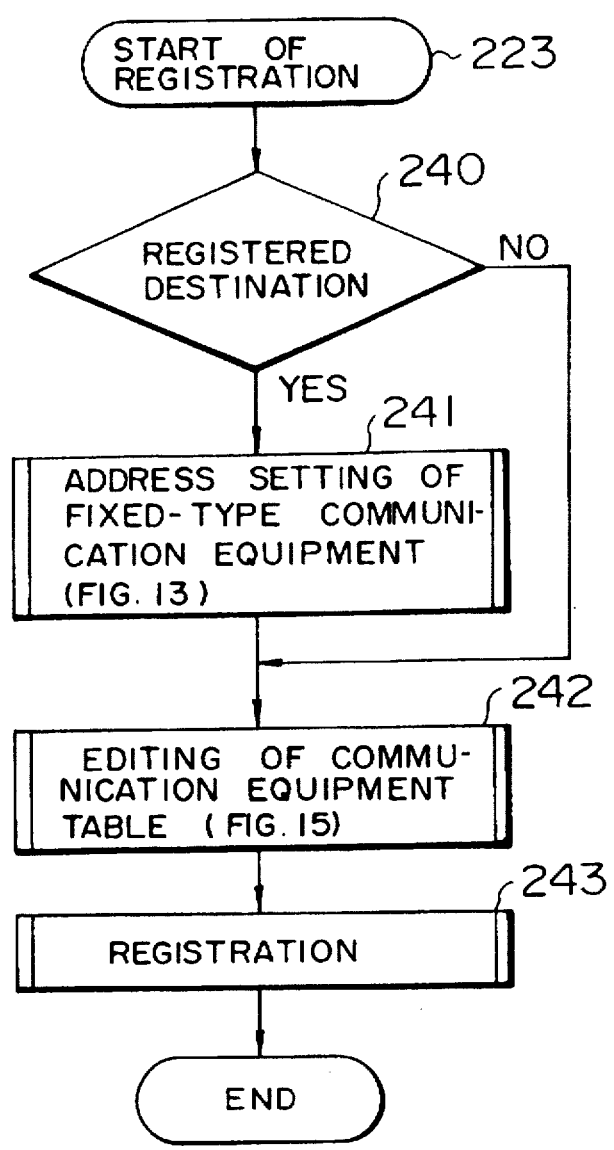
FIG. 12 is a flow chart showing an embodiment of a personal information registration routine.

FIG. 12 shows a flow chart of the processing 223 of registering/updating the personal information utilizing the above-mentioned tables A to D.

Firstly, it is determined whether or not the destination information 204 which has been input from the terminal equipment 102 is the location registered in the table C (the location/communication equipment correspondence table 420) (Step 240).

If the destination information is already registered, after executing a processing 241 of setting an address of the fixed type communication equipment as will be described later, both a processing 242 of editing the communication equipment table and a registration processing 243 are executed. If the destination information is not registered, both the processing 242 of editing the communication equipment table and the registration processing 243 are executed without executing the processing 241.

Figure 13:
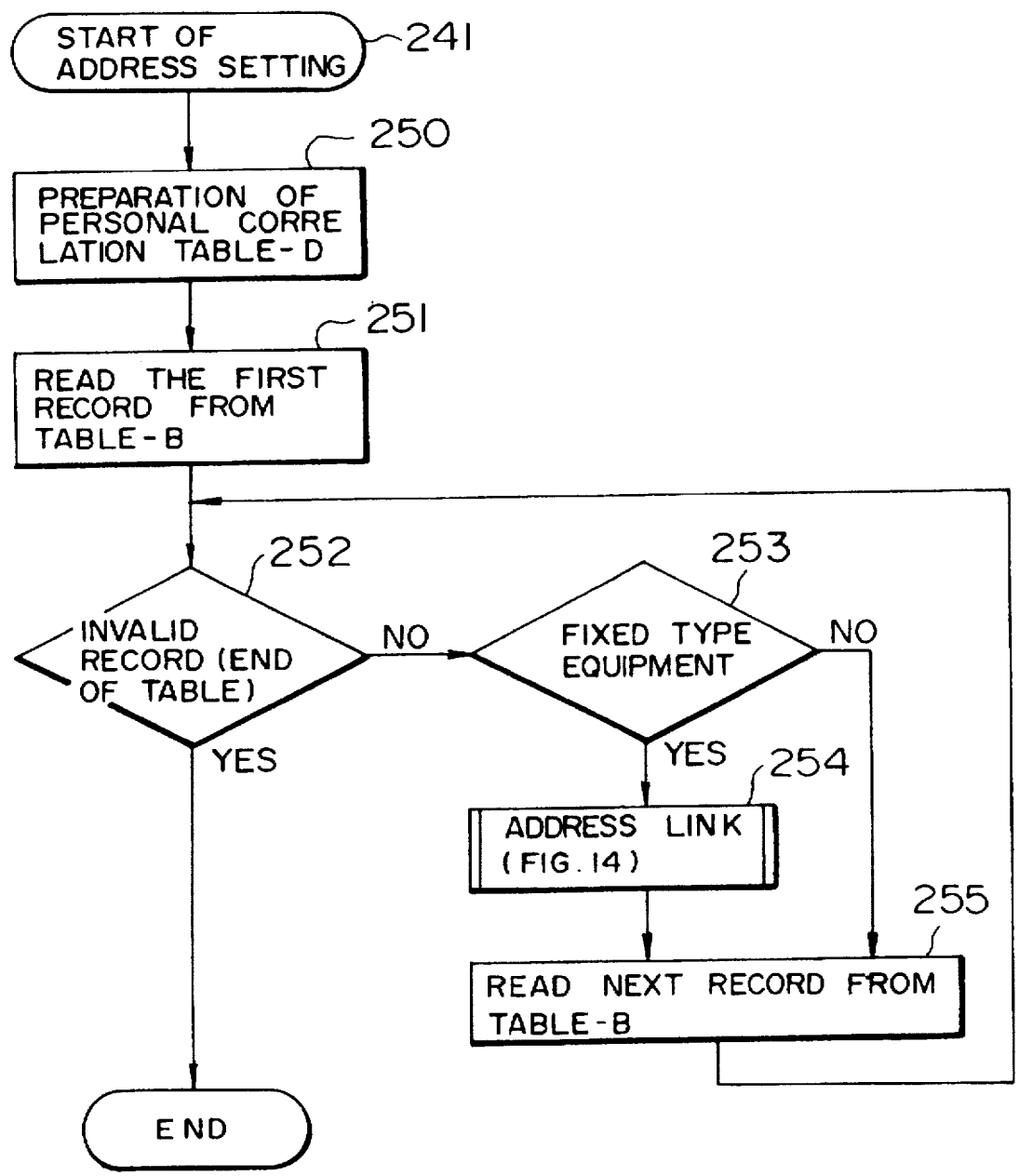
FIG. 13 is a detailed flow chart of Step 240 in FIG. 11.

FIG. 13 shows a detailed flow chart of the processing 241 of setting an address of the fixed type communication equipment. Firstly, the table C (420) is referred thereto on the basis of the destination information 204 which has been input from the terminal equipment 102, and then the record corresponding to the destination location is extracted to produce the table D (450)(Step 250). Next, the first record 410-1 of the table B (410) is read out (Step 251), and then it is determined whether or not the record thus read is an invalid record (Step 252). If the record thus read is an invalid record, this processing is ended. On the other hand, if the read record is a valid record, the attribute of the communication equipment 207 stored in the above-mentioned record 410-1 is determined by referring to the table A (400)(Step 253).

When the first attribute 402 of the above-mentioned communication equipment is "0" in the table A, the processing proceeds to Step 255. On the other hand, when the first attribute is "1" representing the fixed type, after executing an address link processing which will be described later with reference to FIG. 14 (Step 254), the next record is read out from the table B (410) in Step 255, and then the processing is returned to the judgement Step 252.

If the judgement Step 253 with respect to all the valid records in the table B is ended, the next record read out from the table B becomes the invalid record, therefore this processing is ended.

Figure 14:
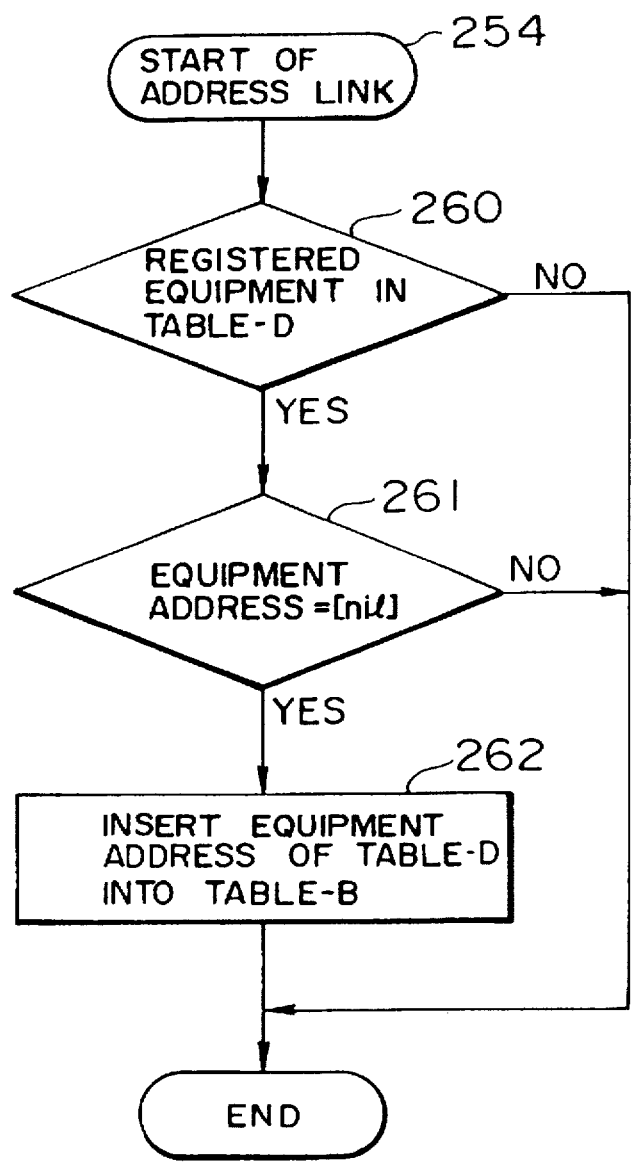
FIG. 14 is a detailed flow chart of Step 254 in FIG. 13.

FIG. 14 shows a detailed flow chart of the address link processing 254.

The address link processing 254 is prepared in order to link the equipment address with the communication equipment address of the destination when the name of the communication equipment 207 which is already registered in the table B (410) matches that of the communication equipment which is installed in the destination location, and also the equipment address 208 of the above-mentioned communication equipment is "nil" on the table B.

More specifically, it is determined whether or not the fixed type communication equipment 207 to which attention is paid currently in the table B matches the communication equipment 452 the data of which is stored in the table D (450) (Step 260). Then, if not, this processing is ended. On the other hand, if so, it is determined whether or not the equipment address 208 of the communication equipment to which attention is paid currently in the table B is "nil" (Step 261). If the equipment address 208 corresponds to the judgement result other than "nil", this address link processing is ended. On the other hand, if the equipment address 208 is "nil", after the equipment address 453 in the table D (450) has been set to the equipment address 208 in the table B (410), this processing is ended.

Figure 15:
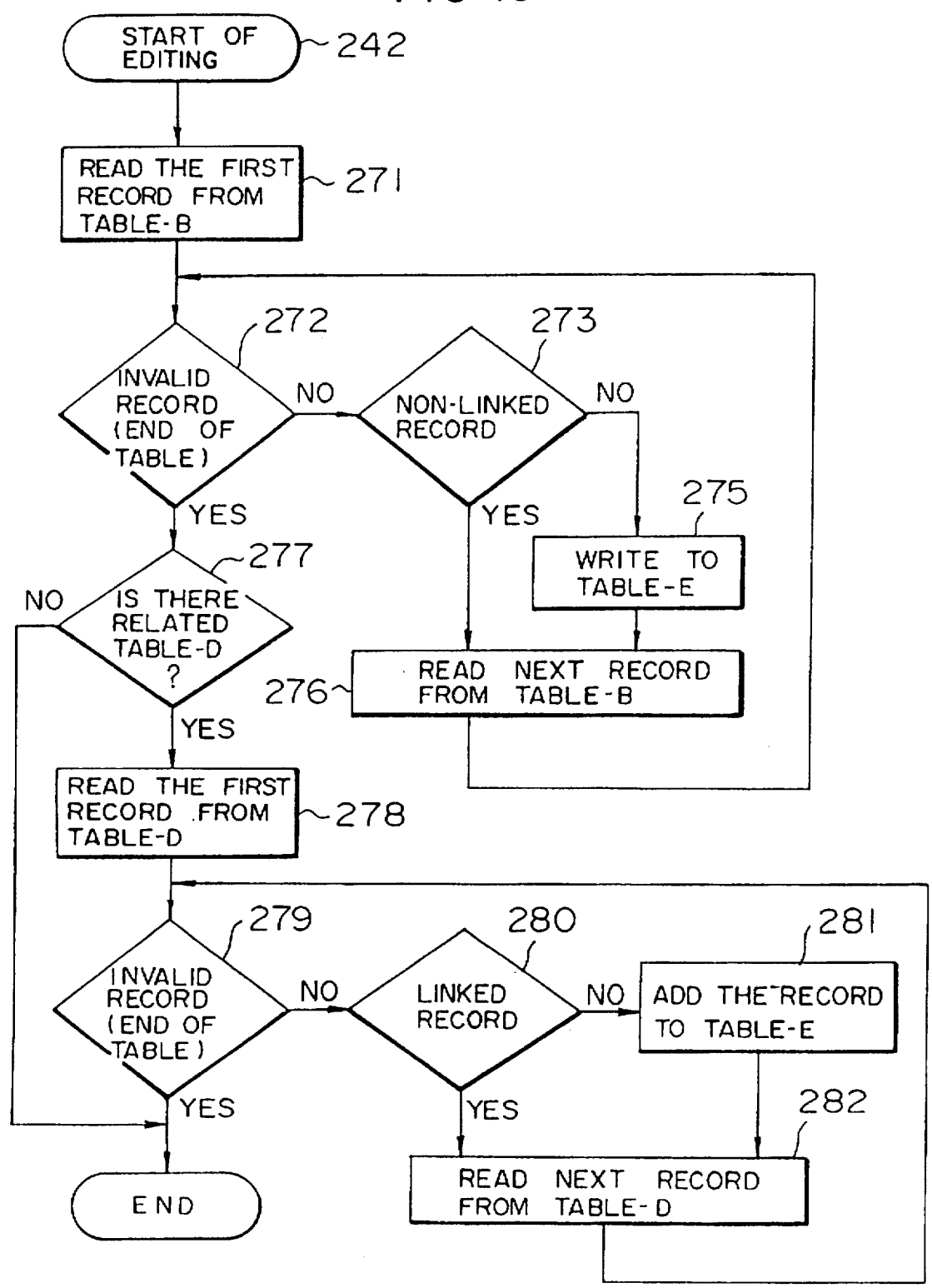
FIG. 15 is a detailed flow chart of Step 242 in FIG. 12.

FIG. 15 shows a detailed flow chart of the processing 242 of editing the communication equipment table.

In this processing 242, the unnecessary communication equipment record is deleted from the communication equipment table B (410) as shown in FIG. 9 and also the communication equipment record(s) remaining in the table D (the destination/communication equipment correspondence table 450 by subscriber) is added to the above-mentioned communication equipment table B, whereby the table E (460) as shown in FIG. 16 is produced.

The first record is read out from the table B (Step 271), and then it is determined whether or not the record thus read is a valid record (Step 272). If so, it is determined whether or not the record of interest is the non-linked record in which "nil" remains in the communication equipment address 208 as it was set thereto (Step 273). If the judgement result is "Yes", i.e., the record of interest is the non-linked record in which "nil" remains in the communication equipment address 208 as it was set thereto, the next record is read out from the table B (Step 276), and then the processing is returned to the judgement Step 272. On the other hand, if the judgement result is "No" in Step 273, after the above-mentioned valid record has been registrated in the table E (Step 275), Step 276 is executed.

When the processing of reading all the valid records in the table B has been completed, the processing proceeds from Step 272 to judgement Step 277, and then it is determined whether or not the table D (450) relating to the above-mentioned table B is present. If the table D is absent, this processing ends. On the other hand, if the table D is present, the first record is read out from the table D (Step 278). Then, it is determined whether or not the record read out from the table D is in invalid record (the table end) (Step 279). If so, this processing ends. If not, it is determined whether or not the record of interest has already been linked with the above-mentioned table E (Step 280). Then, if so, the next record is read out from the table D0 (Step 282), and then the processing is returned to Step 279.

On the other hand, if not in Step 280, after the data relating to the communication equipment 452, and the communication equipment address 453 included in the record read out from the above-mentioned table D have been added to the table E (Step 281), the next record is read out from the table D (450) in Step 282.

By the above-mentioned process, as shown in FIG. 16, there is obtained the table E (460) in which the data is automatically added or corrected in such a way that the record in which the communication equipment address is kept "nil" is deleted, and the equipment address is set to the record 460-6 of the communication equipment the order of priority of which the user specifies out of the communication equipment installed in the destination, and also the record 460-8 of the equipment of the kind the order of priority of which is not specified has the lower priority.

In the registration processing 243 in the flow chart as shown in FIG. 12, out of the personal information, the items 201 to 205 are registered in the form of the personal information table 200 as shown in FIG. 3A in the memory 121 in correspondence to the personal identifier 201, and also the items 207 and 208 are registered in the form of the above-mentioned communication equipment table E (460) in the memory 121 in correspondence to the personal identifier 201.

Figure 17:
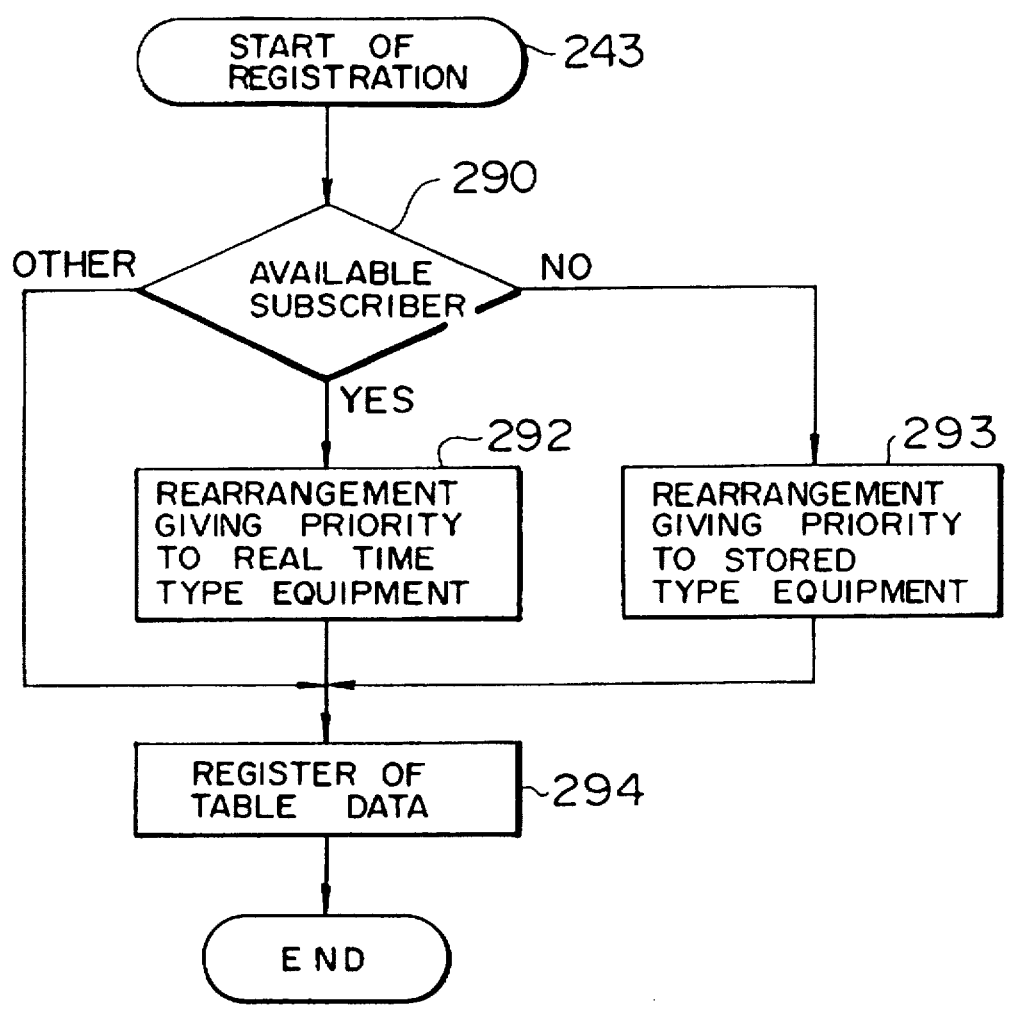
FIG. 17 is a flow chart showing an embodiment of Step 243 in FIG. 12.

FIG. 17 is a flow chart showing another embodiment of the registration processing 243.

In this embodiment, the second status information 205 representing the propriety of the contact to the subscriber in the personal information record is checked (Step 290). Then, if the contact to the subscriber is possible, the rearrangement processing of giving the priority to the real time type equipment is executed (Step 293). On the other hand, if the contact to the subscriber is impossible, the rearrangement processing of giving the priority to the stored type equipment is executed (Step 292). Thereafter, the data in the communication equipment table E is stored in the memory 121 (Step 294).

When the above-mentioned second status information 205 is in the non-defined state in which the contact to the subscriber is neither possible nor impossible, the processing in Step 294 is executed without rearranging the data.

In the rearrangement processing 292 of giving the priority to the real time type equipment, for example, the records are rearranged in such a way that the records 460-5, 460-6 and 460-8 relating to the real time type communication equipment in the table E (460) as shown in FIG. 16 have the higher priorities than those of the records relating to other stored type equipment. Such a rearrangement of the records can be attained in the following manner.

For example, the objective records are read out in turn from the leading portion or the trailing portion of the table 460, the second attribute 403 of the communication equipment attribute table is referred, and it is determined whether or not the equipment of interest is of the real time type. Then, if so, after the objective record(s) has been registered in the temporary table prepared in the work area in the memory 121, the objective record(s) is deleted from the table 460.

The records of the real time type equipment which have been registered in the above-mentioned temporary table are arranged in accordance with the order of priority established between the real time type equipment records on the table 460.

After the above-mentioned processings have been completed with respect to all the records in the table 460, the contents of the two tables are merged in such a way that the group of real time type equipment records which have been registered in the temporary table occupy the locations taking priority over the group of stored type equipment records remaining in the table 460.

In the rearrangement processing 293 of giving the priority to the stored type equipment, the records of the stored type equipment are registered in the temporary table, whereby the table records are rearranged in the same manner as that in the above-mentioned processing 292, i.e., in such a way that the group of records of the stored type equipment occupy the locations taking priority over the group of real time type records.

FIG. 19 shows a configuration of another embodiment of the communication network having a subscriber information service facility according to the present invention.

In this example, to a communication network 101 are connected an information server 120 for the subscriber personal information service, a mail server 130, facsimiles 131 (131A to 131N), terminal equipment 102 (102A to 102N), and telephones 501 (501A to 501N) each having an automatic dialing facility.

Each of the terminal equipment 102 has, as shown in FIG. 20, an interface 502 for controlling the telephone, and a memory 111 which includes a program for the automatic dialing, and is connected to the telephone 501 through the interface 502.

After the user at the above-mentioned terminal equipment 102 has referred to the personal information of the called subscriber, which was output to the screen of the display device 113 and is exemplified in FIG. 7, to specify the communication equipment, on the called subscriber side, which can communicate with the users' telephone 502 by the cursor, the user commands the automatic outgoing by using the input device 114. The dial number of the communication equipment thus specified is stored as the equipment address 208 which has been received from the information server 100 in the memory 111 in the terminal equipment 102. In response to the above-mentioned automatic outgoing command input by the user, the CPU 110 reads out the equipment address 208 corresponding to the specified communication equipment from the memory, and then gives the equipment address 208 thus read out, together with the control signal, to the telephone 501 through the interface 502. When the telephone has received both the control signal and the equipment address from the interface 502, the telephone automatically performs the outgoing dial operation to call the receiving side of the communication equipment.

In the communication network as shown in FIG. 19, each of the terminal equipment 102 may also be coupled to a corresponding facsimile. In this connection, for the facsimile on the receiving side which is selected on the display screen, the call may be established by the automatic dial facility.

As can be understood from the above-mentioned embodiments, according to the present invention, since prior to the communication, the user at each of the terminal equipment can confirm both the status of the called subscriber with whom the user intends to communicate, and the communication equipment which is convenient for the called subscriber, the user can surely communicate with the called subscriber without putting the called subscriber to trouble.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A subscriber information service system including a plurality of terminal equipment and an information server for presenting personal information of a called subscriber to a user at each of said terminal equipment, said information server being connected to said plurality of terminal equipment through a communication network, wherein said information server comprises:
  a memory which stores a subscriber information table having a plurality of personal records, each of said personal records including a personal identifier assigned to each subscriber, the name of the subscriber, status information of the subscriber, and a name and equipment address of communication equipment which can be utilized by the subscriber, and
  a first transmission circuit which transmits, in response to a service request including the personal identifier issued from any of said terminal equipment, content data of the personal record of the specific subscriber to the corresponding terminal equipment; and each of said terminal equipment comprises:
  a second transmission circuit which transmits a service request for requiring the distribution of the personal record of the specific subscriber to said information server, and
  a display which displays either the subscriber list data or the content data of the personal record received from said information server.

2. A subscriber information service system according to claim 1, wherein each of said terminal equipment has an input circuit which inputs updated data of either item of one personal registered in said subscriber information table, and a third transmission circuit which transmits the updated data to said information server; and
  said information server has an updating circuit which rewrites, in accordance with the updated data received from either terminal equipment, the contents of one personal record in said subscriber information table.

3. A subscriber information service system according to claim 2, wherein the status information stored in said memory of said information server includes first status information representing the destination of the subscriber and second status information indicating whether or not a limitation to direct access to the subscriber is present, as subscriber status information, in each of the personal records in said subscriber information table; and said updating circuit includes:
  a translation table which stores data, corresponding to a name of a location, data including a name and an equipment address of the communication equipment installed in that location, and
  an adder which automatically adds the name and the equipment address of the communication equipment installed in the destination which is obtained by referring to said translation table to the personal record when the updated data received from the terminal equipment belongs to the first status information.

4. A subscriber information service system according to claim 3, wherein said information server includes a circuit which automatically changes the order of arrangement of the type of communication equipment and the equipment addresses included in the personal record in accordance with the existence and non-existence of the access limit when the updated data received from the terminal equipment belongs to the second status information.

5. A subscriber information service system including a plurality of terminal equipment, and an information server for presenting personal information of a called subscriber to a user at each of said terminal equipment, said information server being connected to said plurality of terminal equipment through a communication network, wherein said information server comprises:
  a memory which stores a subscriber information table having a plurality of personal records, each of said personal records including a personal identifier assigned to each subscriber, the name of the subscriber, status information of the subscriber, and a name and a equipment address of communication equipment which can be utilized by the subscriber, and
  a first transmission circuit which transmits, in response to a service request including the personal identifier issued from either terminal equipment, content data of the personal record of the specific subscriber to the corresponding terminal equipment; and each of said terminal equipment comprises:
  a second transmission circuit which transmits a service request for requiring the distribution of the personal record of the specific subscriber to said information server,
  a display terminal which displays the content data of the personal record received from said information server,
  an input circuit which specifies one of the name of the communication equipment and the equipment address included in the personal record displayed on said display terminal, and
  a calling circuit which automatically calls the equipment address of the communication equipment specified by said input circuit.

* * * * *